Sept. 28, 1965

R. PERRIER ETAL 3,208,579

MACHINE ADAPTED TO TURN BOTTLES, FLASKS AND THE LIKE ARTICLES UPSIDE DOWN

Filed June 25, 1963

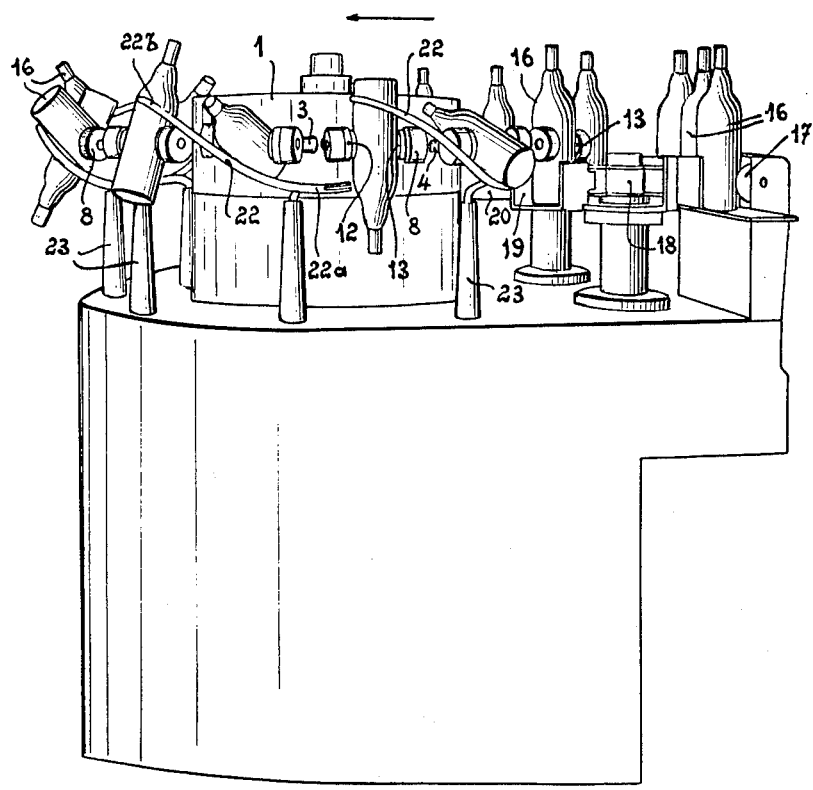

United States Patent Office 3,208,579
Patented Sept. 28, 1965

3,208,579
MACHINE ADAPTED TO TURN BOTTLES, FLASKS AND THE LIKE ARTICLES UPSIDE DOWN
René Perrier and Gérard Perrier, Le Cheylard, Ardeche, France
Filed June 25, 1963, Ser. No. 290,550
Claims priority, application France, July 9, 1962, 42,730, Patent 1,335,567
4 Claims. (Cl. 198—33)

Certain operations require the turning upside down of bottles and flasks in one or several operations through alternating or successive half revolutions, or again through complete revolutions.

This is the case, for instance, for the bottling of certain liquids and, in particular although not exclusively, of lemonades, soda waters, syrups and the like, which operation requires after the filling and closing of the bottle, a mixing or an intimate dissolution of various components, such as extracts or concentrated essences inside the liquid, which may be sparkling or otherwise and contain alcohol or otherwise.

Such a mixing is obtained by turning upside down the bottles once or several times, with a view to urging, each time in succession said syrups, essences or extracts which are heavier from the bottom of the bottle towards its neck and reversely, so as to constrain said components to pass through the liquid mass inside which they are to be dissolved or admixed gradually.

In practice, such a turning upside down is executed generally by hand, which forms a tedious and tring operation and requires a large staff serving a large output bottling machine feeding several thousand bottles per hour.

Machines are known which allow executing mechanically and automatically such bottle turning operations, but such known machines resort to a worm-controlled system driving the bottles through their lower ends so as to make them turn inside a cylindrical chamber in which they are held through their upper ends, which machines are very expensive. Furthermore and chiefly, their operation is harsh and all the more so for large outputs requiring high speeds, which leads to substantial bottle breakages and consequent drawbacks.

It may also be of interest to position the bottle in an inverted position, chiefly for drying or sterilizing a container before its filling, whatever may be its capacity.

Our invention has for its object a machine of a novel design and of a comparatively reduced cost price, while its output is very large and the risk of breaking the bottles is cut out.

According to our invention, the bottles are taken one by one at the input end between two shoes or handles which act after the manner of jaws and close over the body of the successive bottles along two diammetrically opposed generating lines, said shoes being pivotally secured to alined horizontal axes so as to rotate round the latter with the bottle engaged by them and, at the same time, said jaws are bestowed with a translational movement which leads the bottles from the input towards the output of the machine, while during its travel, each bottle is turned upside down once or several times through reciprocatory half revolutions or through complete revolutions.

This turning upside down operation, whether single or repeated as provided through half or complete revolutions, may be obtained through the action of the bottles themselves which are caused to engage and to slide along slopes during their transitional movement, while the bottle-clamping shoes are allowed to freely pivot, or else, said shoes may form driving means as provided through any suitable, pneumatic or hydraulic control system.

According to a preferred embodiment, said shoes are carried by arms distributed pairwise and in star formation along the periphery of a drum assuming a continuous rotary movement, one of the arms of each pair being rigid with the drum, while the other arm is pivotally secured to the drum so that it may first at the input into the machine and throughout its travel through the latter, move towards the stationary arm and hold thus fast a bottle between the corresponding shoes and thenafter move away from the stationary arm so as to release said bottle.

The movement of said movable arm with reference to the stationary arm is controlled advantageously by elastic means, while a cam provides for the subsequent spacing of the movable arm away from the stationary arm. The movement of the movable arm towards the stationary arm may however be obtained through a cam or through any suitable hydraulic or pneumatic means.

Said machine ensuring the automatic turning upside down of the bottles may, in the case of filled and stoppered bottles, be inserted in the chain of machines extending between the bottling machine and the labelling machine. It may also serve for the handling of empty bottles.

The bearing surfaces of the shoes may be given an outline such as will match a fraction of the cylindrical body of the cooperating bottle. Said surface may however be flat. In this latter case, the angular positioning of the shoes in vertical planes is irrelevant, when they are to take hold of the cylindrical body of a bottle.

Said shoes are advantageously coated with a yielding lining and they are preferably positioned so as to take hold of the bottles approximately in an area corresponding to a non-stable position of equilibrium of said bottles so as to cut out any lack of balance during the rocking movement of the latter.

As to the slopes, their ends engaging the bottles with a view to turning them upside down are advantageously provided with a damping member adjustably fitted on said slopes.

The bottles are fed singly and in succession at the input of the machine through any suitable selecting and feeding system such as a worm followed by a star-shaped member.

Similarly, on the output side, the bottles are removed in any direction through any suitable system such as a star-shaped member, a rotary plate, a chain or the like.

We have mentioned hereinabove a circular translational movement of the arms enclosing the bottles between their shoes, but it is obviously possible to give said arms any other translational movement such as a succession of rectilinear movements with all the breaks required therebetween.

Our invention will be readily understood from the reading of the following disclosure, reference being made to the accompanying drawings given solely by way of example and illustrating a preferred embodiment of a machine constraining the bottles to execute a plurality of successive revolutions in the same direction. In said drawings:

FIG. 2 is an elevational side view thereof.

FIG. 7 is a cross-sectional view on enlarged scale through a box member on the end of an arm of the machine as taken along section VII—VII in FIG. 1.

Figure 1:
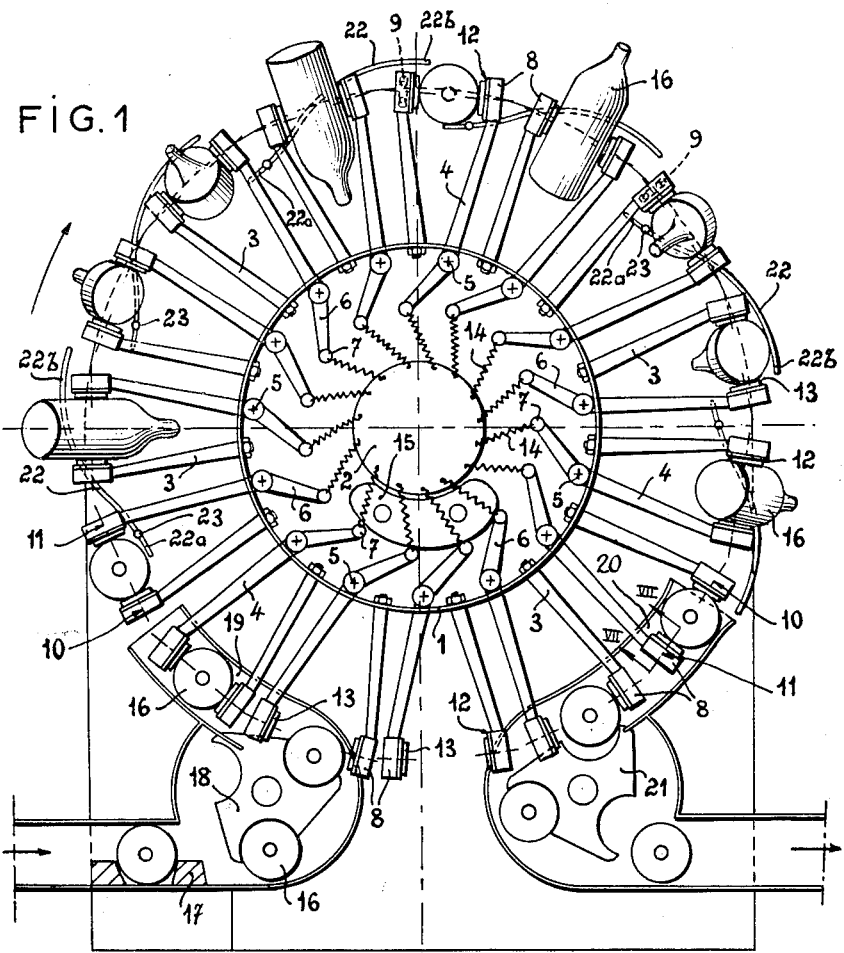
FIG. 1 is a plan view of the machine.

The machine illustrated includes a plate or drum 1 driven in a continuous rotary motion in the direction of the arrow (FIGS. 1 and 2) concentrically with reference to a cylindrical member 2.

Said plate carries a plurality of pairs of arms 3–4 arranged in star formation and undergoing rotary movement with the plate.

Each of the arms 3 is rigid with said plate, whereas each of the arms 4 is pivotally secured to the plate on a vertical spindle 5 and includes an inner extension 6 carrying a roller 7. Said arms 3–4 each carry at their outer end a small box 8 inside which is fitted a cup 12 adapted to revolve freely by rolling inside bearings 9 around the axes illustrated respectively at 10 and 11, each cup carrying a shoe 13 constituted preferably by a rubber block. The inner extension 6 of each arm 4 is subjected to the action of a spring 14 secured through one end to the cylindrical member 2, said springs 14 being adapted to urge the corresponding shoes 13 on the movable arms 4 towards the shoes 13 carried by the stationary arms 3. A stationary cam 15 which does not take part in the rotation of the drum system operates within a predetermined angular area to urge the rollers 7 on the extensions 6 outwardly so as to produce a pivotal movement of the arms 4 in a direction opposed to the action of the springs 14, whereby the jaws constituted by the shoes 13 on the cooperating arms 3–4 open. Said jaw opening area extends adjacent the output end and the input end of the machine in the direction of rotation of the system. The bottles 16 are fed to the input of the machine by selecting means 17 constituted for instance by a worm and they are removed by a star-shaped or like distributor 18 which pushes the bottles singly and in succession into an arcuate channel 19 over the bottom of which they slide.

On the output side, the bottles enter a similar channel 20 and they are removed by extracting means 21 constituted for instance by a star-shaped member similar to the star-shaped member forming the input distributor 18. Said bottles are then removed beyond the extracting means 21 by any suitable means which are not illustrated.

Lastly, the machine includes as an essential component stationary but adjustable slopes 22 carried by supports 23. Said slopes, the number of which is six in the case illustrated, are provided at stationary points distributed along the periphery of the drum and they lead both from the inside outwardly and from the bottom upwardly with reference to the direction of the translational movement of the bottles. Their lowermost operating points 22a are located slightly on the inside of the location of a bottle when upright, while their uppermost points 22b are located slightly outside such a location.

The operation of the machine is as follows, considering the movements of a bottle between its entrance into the machine and its exit out of said machine.

The bottle which is brought by selecting means 17 to the distributor 18 is fed through said distributor into the channel 19 where it enters the interval separating the shoes 13 on the cooperating arms 3–4, the arm 4 being at such a moment spaced away from the arm 3 by reason of its roller 7 engaging then the stationary cam 15. The bottle is thereafter advanced through the channel 19 by the stationary arm 3 and, almost immediately thereupon, the roller on the arm 4 is no longer in contact with the cam 15. The spring 14 controlling said arm 4 urges the latter rearwardly so that the bottle is now clamped between the cooperating shoes 13.

Figure 3:
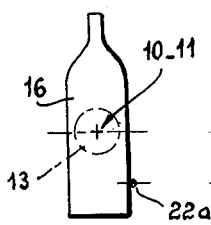

The rotation of the drum continues and the bottle passes out of the channel 19 and is held solely by the jaws formed by the shoes 13. The bottle then engages through its section located near its bottom the lower end 22a of the first slope 22. Said slope constrains the bottle to rub against it and to roll on it in unison with the shoes 13 which revolve freely around the corresponding axes 10 and 11, which axes, as already mentioned, are in alignment (FIG. 3).

Figure 4:
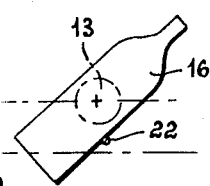
FIGS. 4 to 6 illustrate on a larger scale four successive positions assumed in succession by a bottle inside the machine.
Figure 5:
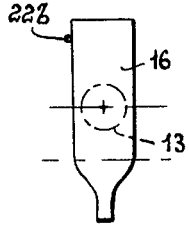

The bottle continues its progression with the drum and during this progression, it rocks to an increasing extent by reason of the shape given to the slope 22 over which it slides (FIG. 4) until said bottle leaves the upper outermost end 22b of said slope. The bottle has then been subjected to a half revolution so that its neck is directed downwardly (FIG. 5).

Figure 6:
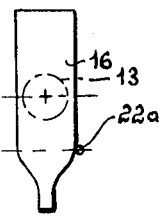

As the bottle continues its movement, it engages through the section of its body located near its neck, the following slope 22 (FIG. 6) which constrains it to execute in the same direction as before a further half revolution in the manner disclosed with reference to the first slope.

The bottle has then returned into its normal upright position after it has been subjected to a complete revolution through the successive action of the two first slopes engaged by said bottles.

The following slopes execute again the same operation to each make the successive bottles turn by one half revolution.

The drawing illustrates the case of a machine provided with six slopes 22 which provide consequently three complete inversions and return movements of the bottle, but said number of slopes may be reduced or increased in accordance with the number of complete revolutions required for the successive bottles, provided however the number of said slopes is even so that at the output of the machine, the bottle resumes its normal upright position.

When the bottle reaches the output end of the machine, it enters the channel 20 and the movable arm 4 clamping it in the manner disclosed, is urged away from the cooperating arm 3 by reason of the roller 7 on its extension 6 having reengaged the cam 15.

The bottle is now free and rests on the bottom of the channel 20 so that it slides over said bottom as provided by the thrust exerted by the arm 3 rigid with the rotating drum. It is then engaged by the extracting member 21 which urges it outwardly.

Obviously and as illustrated in FIG. 2, all the bottles execute in sequence the same movements. The bottles are thus all turned upside down and returned into an upright position several times without any manual operation, in a smooth and gradual manner, without any shocks.

As illustrated, the small boxes 8 are not located in alignment with the carrier arms corresponding thereto so that when the bottles are clamped between the corresponding shoe 3, said boxes may be parallel pairwise, that is the axes 10 and 11 should be aligned to allow a free rotation of said shoes 13 as required for operation.

Lastly, it is obvious and apparent from the above disclosure, that the invention is by no means limited to the sole embodiment disclosed hereinbefore and illustrated in the accompanying drawings by way of example and our invention covers in contradistinction all modifications of said embodiment falling within the scope of the accompanying claims.

What we claim is:

1. A machine for inverting a succession of bottles at least once, while advancing the bottles along a path, said machine comprising a drum having a vertical axis and adapted for rotating with a continuous rotary movement around said axis, input means for feeding bottles successively to the drum at a first predetermined point stationary in space, output means for removing the bottles successively from a second predetermined point stationary in space, a plurality of pairs of arms distributed in a substantially radial direction along the periphery of the drum, and extending outwardly of the latter, one arm of each pair being rigid with the drum and the other arm being pivotally secured to said drum for movement about a vertical axis, a shoe on the outer end of each arm of each pair, means supporting the shoes on the arms of each pair for revolvable movement around a common horizontal axis, elastic means urging the pivotal arm of each pair towards the cooperating rigid arm to hold a bottle between the shoes at the ends of the arms of said pair to allow said bottle to be rotatably held by the shoes relative to said arms, while the rigid arm of each said pair is effective to advance the bottle in revolving movement about the axis of the drum as the latter rotates, stationary cam means urging the pivotal arm of each pair away from the cooperating rigid arm of the same pair when such pivotal arm reaches the second stationary point and releasing said pivotal arm when it reaches the first point to allow the clamping of the bottles between the shoes through the remaining fraction of each revolution of the drum extending from the first to the second stationary point, and a plurality of even number slope members distributed around the drum and extending between the two stationary points, said slope members having a curvature in two directions and curving upwardly and outwardly in the direction of rotation of the drum, said slope members being fixed in position relative to the shoes on the arms to contact a bottle held by each pair of shoes to cause the bottle to be gradually inverted about the corresponding horizontal axis of the shoes which engage the bottle as the bottle passes along each of the slope members, the bottle undergoing successive inversions by each of the slope members.

2. A machine as claimed in claim 1 wherein said means supporting the shoes on the arms comprises a box member secured to a respective arm, and a cup member supported in said box member for rotation therein, each cup member supporting a corresponding shoe.

3. A machine as claimed in claim 2 wherein the box members on the arms of respective pairs are out of alignment with the arms by an amount such that with the arms engaging a bottle therebetween the cup members are in axial alignment.

4. A machine for rotating a succession of bottles at least once while advancing the bottles along a path, said machine comprising rotatable drum means adapted for rotation about a vertical axis, a plurality of pairs of arms on said drum means extending radially outwardly thereof and driven in revolving movement about said axis by rotation of the drum means, one arm of each pair being a fixed arm rigidly secured to the drum means for rotation therewith, means supporting the other of the arms of each pair from the drum means for pivotal movement about a vertical axis such that said other arm is a pivotal arm which is pivotally movable towards and away from the fixed arm, spring means engaging each of the pivotal arms of each pair and urging the latter towards the fixed arm of the same pair, stationary cam means located along a prescribed portion of the path of the drum means for successively engaging the pivotal arm of each pair to displace the same away from the corresponding fixed arm and thereby hold the arms apart for a particular portion of revolving travel of the arms, said arms being positioned on the drum means such that the pivotal arm of each pair advances ahead of the fixed arm of the same pair, input means positioned at a fixed location in space at the end of the prescribed portion of the drum means for introducing a bottle between the open arms of each pair, output means positioned at a fixed location in space at the beginning of the prescribed portion of the drum means for removing a bottle from between the open arms of each pair, shoe means supported on the arms of each pair for engaging a bottle therebetween and holding such bottle suspended by the arms in the portion of travel outside said prescribed portion, means supporting said shoe means for rotation from the corresponding arms such that the shoe means of each pair of arms are rotatable about a common horizontal axis when a bottle is supported therebetween, said fixed arm of each pair being effective to advance the bottle engaged thereby around said vertical axis of the drum while the pivotal arm under the action of the associated spring means clamps the bottle between the arms, and a succession of fixed slope members, each being positioned along the path of travel of the bottles and having curvature in a radial and verticle direction to directly engage the bottles themselves and gradually invert the bottles successively as they pass thereon whereby each bottle becomes successively inverted by the slope members, said slope members being present in an even number such that the bottles are discharged by the output means in the same position as when they entered the input means.

References Cited by the Examiner

UNITED STATES PATENTS

| | | | |
|---|---|---|---|
| 418,495 | 12/89 | Brooks | 214—18.3 X |
| 1,958,846 | 5/34 | Christensen | 214—313 |
| 2,821,158 | 1/58 | Brown | 198—210 |
| 3,080,078 | 3/63 | Carew | 214—305 |

SAMUEL F. COLEMAN, *Primary Examiner.*

ERNEST A. FALLER, *Examiner.*